United States Patent [19]

Reynolds

[11] 3,741,703

[45] June 26, 1973

[54] APPARATUS FOR MAKING SPHERICAL GRANULES

[75] Inventor: Anthony Desmond Reynolds, London, England

[73] Assignee: Lilly Industries Limited, London, England

[22] Filed: Apr. 26, 1971

[21] Appl. No.: 137,291

[52] U.S. Cl.................. 425/222, 425/8, 425/402, 264/8
[51] Int. Cl. .......................................... B29c 23/00
[58] Field of Search................... 425/8, 332, 222, 425/402; 264/8

[56] References Cited
UNITED STATES PATENTS

| | | | |
|---|---|---|---|
| 3,277,520 | 10/1966 | Nakahara | 425/332 |
| 2,439,772 | 4/1948 | Gow | 425/8 X |
| 1,224,815 | 5/1917 | Walters | 425/8 X |
| 809,671 | 1/1906 | Cowing | 425/8 |

FOREIGN PATENTS OR APPLICATIONS 410,326  2/1925  Germany ......................... 425/332

Primary Examiner—Robert L. Spicer, Jr.
Attorney—Everet F. Smith and Ralph W. Ernsberger

[57] ABSTRACT

An improvement to an apparatus for making spherical granules from extrusions of wet plastic solid material comprising incorporating into said apparatus a rotatable frictional plate having the peripheral portion turned upwardly as it extends radially outwardly toward the encircling container wall.

3 Claims, 3 Drawing Figures

PATENTED JUN 26 1973

3,741,703

INVENTOR.
ANTHONY DESMOND REYNOLDS

BY *[signature]*
ATTORNEY

APPARATUS FOR MAKING SPHERICAL GRANULES

BACKGROUND OF THE INVENTION

This invention relates to an apparatus for making spherical granules from wet plastic extrusions. More particularly, this invention relates to an improvement to the apparatus described in U.S. Pat. No. 3,277,520.

DESCRIPTION OF THE PRIOR ART

U.S. Pat. No. 3,277,520 discloses an apparatus for making spherical granules from cylindrical extrusions of plastic solid material, and among the many features of said apparatus is a rotatable flat frictional plate. This plate serves several functions in the operation of the equipment; one of which is that of providing motion to the particles which are introduced onto the plate for spheronizing. As this plate rotates, it imparts motion to the particles thereon, and by the application of centrifugal force thereto causes the particles to be moved outwardly toward the outer extremeties of the plate and up against the wall of the cylindrical container which confines the plate. The particles take on a multidirectional movement in a toroidal ring. As the particles move in the toroidal ring, they are shaped by attrition from the contact of one with another, and with the container wall and the plate inself, and in a brief operation taken on spherical characteristics. However, because there is essentially a right angle between the peripheral edge of the flat plate and the walls of the cylindrical container, there is an area extending inwardly from this included angle where the particles do not move with the main stream of the moving toroidal ring and consequently do not achieve the same measure of contact with other particles and are not thereby accorded the same treatment. For this reason efforts were directed at a design of the frictional plate which would remove, or at least lessen, the space around the circumference of the apparatus wherein particle movement was impeded and as a consequence, impart the same treatment to all of the particles all of the time.

SUMMARY OF THE INVENTION

It has now been discovered that when the peripheral portion of the frictional plate is turned upwardly as said plate extends radially outwardly toward the encircling container wall, the space wherein particle movement is impeded is significantly reduced and consequently the treatment of the particles is more uniformly effected resulting in an improved distribution of particle size and conformation. Additionally, the lifting force applied to the particles as they approach the edge of the upwardly turned frictional plate, is increased thereby reducing the loss of material passing through the gap between the container wall and the plate edge.

DESCRIPTION OF THE PREFERRED EMBODIMENTS

In the following detailed description of the embodiments of this invention, reference is made to the accompanying drawings.

Figure 1:
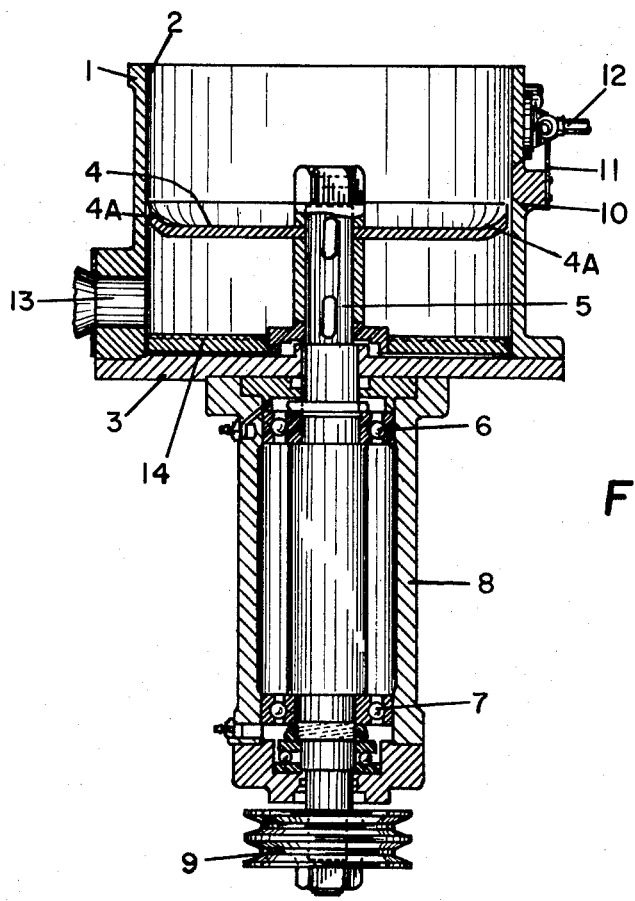
FIG. 1 is a cross-sectional, side elevational view of the apparatus incorporating the improvement in accordance with this invention.

FIG. 1 is a cross-sectional, elevational view of the apparatus incorporating the improvement in accordance with this invention. The apparatus comprises a cylindrical opened-top vessel 1 of circular cross-section having a smooth internal wall 2. The cylinder is closed at its lower end by base plate 3 having a diameter of 30 cm. to 500 cm.

Rotatable within this cylinder 1 is a circular plate 4. The plate 4 is generally flat and its periphery sweeps closely adjacent the wall surface 2 as the plate rotates. The peripheral portion 4A of the plate 4 is turned upwardly. The upwardly turned portion is in the shape of a circular arc which blends smoothly with the remainder of the upper surface of the plate 4 and with the upright wall surface 2. The upper surface of the plate 4 is roughened by having intersecting grooves milled in it. The grooves intersect generally at right angles and are from 1 to 2 millimeters deep and are spaced apart at distances at 2 to 4 millimeters. The grooves are so chamfered that the sides thereof join at essentially a right angle.

The plate 4 is mounted on the upper end of a shaft 5 which passes through the base plate 3 and is rotatable in bearings 6 and 7 in a tubular housing 8 mounted beneath the base plate 3. The lower end of the shaft 5 projects from the housing 8 and has mounted to it a pulley wheel 9 through which a drive may be transmitted to the shaft.

In the wall of the vessel 1 adjacent and above the periphery of the plate 4 is formed an aperture 10 through which the formed particles may be removed. The aperture is closed, when the apparatus is in operation, by a plug 11 pivotally mounted on the outside of the vessel wall operable by a lever 12.

The upright wall surface 2 is precision machined to an essentially true circle and the plate 4 is, at its peripheral edge, machined to a true circle so that as the plate 4 rotates within the wall 2 of the vessel 1 the clearance between the outer periphery of said plate 4 and said wall 2 is limited to no more than 0.25 millimeter.

A fan 14 is located on the shaft at the bottom of the cylinder and turns with the rotating plate drawing air in through the port 13 to provide the passage of air under pressure between the wall 2 and the peripheral edge of the plate 4 to prevent the tendency for any of the material on plate 4 from falling between the edge of the plate and the wall of the vessel.

In one embodiment of this invention the upper surface of the frictional plate 4 can be roughened by means such as the intersecting grooves hereinbefore described. However, other kinds of roughened surface may be provided such as, for example, a sandblasted surface which results in a pitted surface which tends to resist the sliding of the particles when the plate is rotated.

For ease of manufacture the upper surface of the frictional plate 4 can comprise an insert secured to the upper surface of a rotatable base structure. By this means various forms of frictional surfaces can be readily interchanged on the apparatus and also a worn surface can be readily replaced.

Although the rotating speed of the frictional plate 4 depends on the nature of the material, the diameter of the particles being spheronized, the diameter of said plate, and on the characteristics of the upwardly turned periphery of said plate, it is generally around 30 to 1,500 r.p.m. The preferred r.p.m. is from about 400 to about 800. Taking into account the variable diameter of the plate and the variable speed of rotation of the plate, it is desirable that the peripheral speed of plate 4 should lie between 30 and 2,000 metres per minute.

Figure 3:
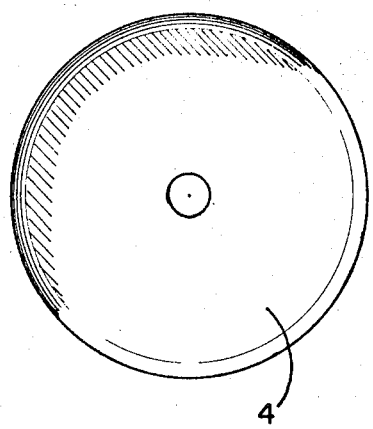
FIG. 3 is a top horizontal view of the device constituting the improvement in accordance with this invention.
Figure 2:
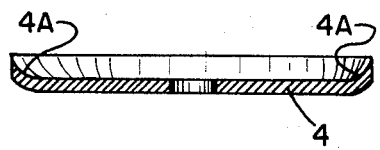
FIG. 2 is a cross-section, side elevational view of the device constituting the improvement in accordance with this invention.

A generally desirable cross-sectional view of the frictional plate 4 is illustrated in FIG. 2. In FIG. 2, the plate 4 is shown as having an upwardly turned peripheral portion in a circular arc. A top horizontal view of the frictional plate 4, wherein the peripheral portion is turned upwardly in a circular arc, is shown in FIG. 3. The upwardly turned peripheral portion 4A of plate 4 can be so constructed that the radius of the circular arc which describes the shape of said upwardly turned portion can be betweeen the radius of plate 4 and 1/20 of that radius. And when any radius is employed within the range described, the upwardly turned peripheral portion 4A of the plate 4 is, when viewed in cross-section, a circular arc wherein a line tangent to said arc at the upper-outer edge of said plate makes an angle of from about 105° to about 180° when projected through a line parallel to said container wall 2.

Many variations can be made to the apparatus described above without departing from the scope of the present invention. For example, the upwardly turned portion 4A of the plate may be differently shaped. If it is the form of the arc of a circle as shown, the radius of the arc may vary between the radius of the plate 4 and 1/20 of that radius. It is necessary, however, that there should be sufficient height of the wall above the peripheral edge of the plate to insure that particles do not escape from the vessel, and it is found in practice that the height of the vessel wall above the upper-outer edge of the periphery of the plate is preferably at least equal to half the radius of the plate.

The curve of the upwardly turned portion 4A need not necessarily be a circular arc and any suitable curve may be employed. Preferably the curve blends smoothly with the surface of the plate 4 and with the wall 2; however, the upwardly turned portion may also be a straight inclined portion which intersects the horizontal surface of the plate 4 fairly sharply. In any case it is preferable for the line joining the inner edge to the outer edge of the upwardly turned peripheral portion 4A to be inclined at an angle of from about 15° to about 45° to the horizontal.

In any case, whatever the configuration or the location, the upwardly turned peripheral portion 4A can be turned upwardly to the extent that a line drawn from the point of departure of the upwardly turned portion from the generally flat inner portion of plate 4 to the upper-outer edge of the peripherl portion 4A makes an angle of from about 15° to 45° to the plane of the surface of plate 4.

A method of using the apparatus according to this invention, and for producing spherical particles, comprises turning the rotatable plate 4 with nonspherical particles in contact therewith so that the particles are moved outwardly under centrifugal force and are deflected upwardly by the upwardly turned peripheral portion 4A, before falling back onto the upper surface of plate 4 to be moved outwardly again, the process continuing until the particles have been made sufficiently spherical by the centrifugal and frictional forces acting on them.

The method may include the preliminary step of forming the nonspherical particles by extruding a plastic material and then dividing the extrudate into particulate form. The dividing of the extrudate may be effected by introducing the extrudate into the apparatus according to this invention, so that it is broken up or may be effected by other means before the material is introduced into apparatus.

The material may be extruded to have a circular cross-section and is preferably divided into cylindrical particles the length of which is approximately the same as their diameter.

The process of using the apparatus described for the purpose of spheronizing material involves preliminarily partially shaping the granule followed by the utilization of friction and surface forces in the apparatus to form spheres. As used in this specification, the word "spheronize," and its derivatives, mean to form into a sphere; including the operations carried out to produce such spheres from non-spherical particles. Powdered raw materials are first converted into a plastic mass, using water or other solvents in conjunction with binding agents. This mass is extruded under pressure through a perforated screen or die. The cylindrical spaghetti-like extrudate is placed on plate 4 in the apparatus and the plate rotated. The cylinders of material are urged outwardly across the roughened surface of plate 4 by centrifugal force and are deflected upwardly by the upwardly turned peripheral portion 4A or said plate before falling back onto the upper surface of said plate to be thrown outwardly again. This process first breaks down the cylinders until the length of the particles is approximately equal to their diameter. The particles are then rolled into spheres by centrifugal and frictional forces. In some cases it can be advantageous to break down the extrudate into smaller particles before it is first introduced into the apparatus.

The initial mixing of the dry raw material is accomplished in traditional mixers. The amount of water, solvents and other excipients used is dependent on the nature of the raw material.

The extruder for extruding the material can comprise a single or double screw which feeds the moistened material into a radial screen or axial die from which it is extruded. Extruders are well-known that produce cylindrical, or the like, extrudate from various materials. Radial screens or flat dies are employed which produce extrudate having a cross-section of from about 0.5 to about 15 mm. in diameter in cylinders of from about 2 to about 20 cm. in length.

When the product from the extruder is fed onto the revolving plate 4, it becomes disposed against the wall 2 in an annular or donut-like shape with a quadrant cross-section. This shape appears to be twisting like a woven rope. It can be described as similar to that of a moving toroidal ring. This characteristic disposition of the material is due to the transport of granules centrifugally to the periphery of the plate where, as mentioned above, their residual momentum, as they pass over the upwardly turned peripheral portion 4A causes them to rise up the stationary wall 2 and then to fall within or over the mass of granules as their momentum is dissipated. Accelerating and decelerating of the particles within the mass forms a pattern of velocity gradients which result in the rope-like formation, or moving toroidal ring.

The requirements for spheronization of the cylindrical extrudate are; the extrudate must be broken into uniform lengths approximately equal to their diameter, absence of friability in these lengths, inherent or induced plasticity in the cylindrical pellets, and nonadhesion between the pellets when they are rolled together.

The operation of the apparatus described in this invention may be by a batch or continuous process. In the latter a multiplate system with overflow from a weir is used. The time taken to break up and to spheronize the extrudate is usually between 15 seconds and 5 minutes, an average time being 1 to 2 minutes. The uniformity of size of the spheres produced and the time taken for processing are dependent upon the plasticity and moisture content of the extrudate, the nature of the ingredients in the formula, the temperature, the speed of rotation of the frictional plate, the depth and spacing of the serations on the plate and the quantity processed. The resulting spheres, when emptied from the apparatus, can be dried in a fluidized bed drier, or by other suitable means.

The basic technique used in preparing formulae for spheronization in the apparatus is similar in many respect to that employed in making wet granulations. The main factor in successful spheronization of a product is the formula of the plastic mass and the subsequently spheronized material. Formulae with good extrusion characteristics do not necessarily produce good spheres, and the composition generally must be a compromise between the two processing stages.

A well-formulated extrusion will normally show adequate cohesion and will break into the required length. Excess friability is overcome either by having a higher proportion of binder or liquid in the mix, or by adding a liquid or finely powdered binding agent to the granules in the apparatus. If the extrudate is insufficiently plasticized for spheronization, the formula may be modified in the apparatus by addition of liquid or, with thermoplastic material, heat may be applied. Adhesion between the rolling particles can occasionally be a problem, but can nearly always be overcome by addition of a proportion of a finely divided powdered substance such as microcrystalline cellulose, starch or talc, to the apparatus which is adsorbed onto the sticky surfaces and thus, provides a basis for frictional rolling and separation. Excessive lubrication in the apparatus either by migration of liquid to the particle periphery or by a constituent in the formula (e.g., silicone oils), may be experienced and is indicated by rotation of the plate without movement of the particles. It can be overcome by addition of such material as starch powder which increases interparticle friction.

In comparison with spherical particles produced by the apparatus described in this invention but in which there is incorporated a frictional plate which is flat from its center to its peripheral edge, those which are produced on the apparatus in which the improvement described in this invention has been incorporated have the advantages of regularity in shape, consistency of size and surface characteristics not found in the goods produced by the apparatus of the prior art. This is so because the particles produced in the apparatus having the peripheral portion 4A of the frictional plate 4 turned upwardly are subjected to a more uniform flow in the moving toroidal ring and consequently the mass of particles are treated more evenly and consistently due to the uniformity of the movement. This permits not only a greater uniformity of particle size but results in a reduced quantity of fines because it is possible to achieve the spheronization in a lesser amount of time resulting from the more uniform movement of the particles, consequently requiring a shorter treatment time to achieve the desired results.

What is claimed is:

1. In an apparatus for making spherical granules from plastic spaghetti-like extrudate comprising a vertical cylindrical container having a means for feeding material at its top, and a window in its side in its lower part for discharging material; a vertical rotatable shaft disposed in the center of said container; a frictional plate disposed on said shaft at essentially a right angle thereto, and extending therefrom so that the peripheral edge of said plate is immediately adjacent to, but not in contact with, the innerwall of said container; and means for rotating the rotatable shaft, the improvement which comprises disposing on said rotatable shaft a frictional plate having the peripheral portion thereof turned upwardly said upwardly turned peripheral portion of the friction plate is, when viewed in cross-section, a circular arc, said arc having a radius in the range of about 1/20 of the radius of said plate to about that of the radius of said plate and said upwardly turned peripheral portion of the frictional plate is inclined at an angle of between about 15° and about 45° to the plane of the surface of said plate as it extends radially outward toward said container wall.

2. The improvement as defined in claim 1 wherein the upwardly turned peripheral portion of the frictional plate is, when viewed in cross-section, a continuous curve blending smoothly with the upper surface of said plate and the surface of the wall of said container.

3. The improvement as defined in claim 2 wherein the upwardly turned peripheral portion of the frictional plate is, when viewed in cross-section, a circular arc wherein a line tangent to said arc at the upper-outer edge of said plate makes an angle of from about 105° to about 180° when projected through a line parallel to said container wall.

* * * * *